United States Patent
Noh et al.

(10) Patent No.: US 11,553,434 B2
(45) Date of Patent: Jan. 10, 2023

(54) POWER SUPPLY METHOD AND ELECTRONIC DEVICE THEREFOR

(71) Applicant: Samsung Electronics Co., Ltd., Gyeonggi-do (KR)

(72) Inventors: Juseok Noh, Gyeonggi-do (KR); Duhyun Kim, Gyeonggi-do (KR); Seongmin Kim, Gyeonggi-do (KR); Younghoon Kim, Gyeonggi-do (KR); Sungok Park, Gyeonggi-do (KR); Kicheol Sung, Gyeonggi-do (KR)

(73) Assignee: Samsung Electronics Co., Ltd., Suwon-si (KR)

(*) Notice: Subject to any disclaimer, the term of this patent is extended or adjusted under 35 U.S.C. 154(b) by 0 days.

(21) Appl. No.: 17/005,557

(22) Filed: Aug. 28, 2020

(65) Prior Publication Data

US 2021/0092686 A1 Mar. 25, 2021

(30) Foreign Application Priority Data

Sep. 19, 2019 (KR) .......................... 10-2019-0115449

(51) Int. Cl.
*H04W 52/00* (2009.01)
*H04W 52/02* (2009.01)

(52) U.S. Cl.
CPC ... *H04W 52/0296* (2013.01); *H04W 52/0251* (2013.01)

(58) Field of Classification Search
CPC . H04W 52/00; H04W 52/02; H04W 52/0296; H04W 52/0251
See application file for complete search history.

(56) References Cited

U.S. PATENT DOCUMENTS 5,204,610 A * 4/1993 Pierson ................... H02J 9/061
320/126
6,141,569 A * 10/2000 Weisshappel ....... H01M 50/213
455/572

(Continued)

FOREIGN PATENT DOCUMENTS

| KR | 10-2006-0071002 A | 6/2006 |
| KR | 10-2016-0098863 A | 8/2016 |
| KR | 10-1673533 B1 | 11/2016 |

OTHER PUBLICATIONS

International Search Report dated Dec. 8, 2020.
European Search Report dated Feb. 24, 2021.

*Primary Examiner* — Jinsong Hu
*Assistant Examiner* — Farideh Madani
(74) *Attorney, Agent, or Firm* — Cha & Reiter, LLC

(57) ABSTRACT

An electronic device may include, for example: a first battery; at least one second battery; a power management module configured to monitor capacity information of the first battery; and a processor electrically connected to the first battery, the at least one second battery, and the power management module. The processor may be configured to: monitor whether a designated event or a low-power state in which a voltage of the first battery drops below a reference value has occurred, while the electronic device is driven using the first battery; determine that the designated event has occurred or that the first battery corresponds to the low-power state; and parallel-connect the first battery and at least one of the at least one second battery, based on determining that the designated event has occurred, or that the first battery corresponds to the low-power state. Various other embodiments are possible.

16 Claims, 7 Drawing Sheets

(56) References Cited

U.S. PATENT DOCUMENTS

| | | | |
|---|---|---|---|
| 9,800,719 B1* | 10/2017 | Botts | H04M 1/0262 |
| 2004/0075345 A1* | 4/2004 | Yoshioka | H04W 52/0296 |
| | | | 307/66 |
| 2010/0130263 A1* | 5/2010 | Zhang | H04B 1/3883 |
| | | | 455/572 |
| 2018/0115945 A1* | 4/2018 | Lee | H04W 48/18 |
| 2018/0324964 A1 | 11/2018 | You et al. | |
| 2019/0103143 A1 | 4/2019 | Hasbun et al. | |

* cited by examiner

POWER SUPPLY METHOD AND ELECTRONIC DEVICE THEREFOR

CROSS-REFERENCE TO RELATED APPLICATION(S)

This application is based on and claims priority under 35 U.S.C. 119 to Korean Patent Application No. 10-2019-0115449, filed on Sep. 19, 2019, in the Korean Intellectual Property Office, the disclosure of which is herein incorporated by reference in its entirety.

BACKGROUND

1) Field

One or more embodiments described below generally relate to a power supply method and an electronic device therefor.

2) Description of Related Art

Recent developments in digital technologies have led to widespread use of various types of electronic devices, such as mobile communication terminals, smartphones, tablet personal computers (PCs), electronic wallets, personal digital assistants (PDAs), and wearable devices. These electronic devices may be connected to a communication network such as the Internet. In order to satisfy the demands for wireless data traffic, which are increasing since the commercialization of $4^{th}$ Generation (4G) communication systems, there have been ongoing efforts to develop improved $5^{th}$ Generation (5G) communication systems or pre-5G communication systems. 5G communication systems or pre-5G communication systems are referred to as beyond 4G network communication systems or post long term evolution (post LTE) systems.

The above information is presented as background information only to assist with an understanding of the disclosure. No determination has been made, and no assertion is made, as to whether any of the above might be applicable as prior art with regard to the disclosure.

SUMMARY

An electronic device that can simultaneously access different communication systems (for example, 4G communication system and 5G communication system), may require increased power. In this case, a method for stably supplying power may be required by the electronic device such that, even if the electronic device simultaneously accesses different communication systems, the communication performance can be optimized.

An electronic device according to an embodiment may include, for example: a first battery; at least one second battery; a power management module configured to monitor capacity information of the first battery; and a processor electrically connected to the first battery, the at least one second battery, and the power management module. The processor may be configured to: monitor whether a designated event or a low-power state in which a voltage of the first battery drops below a reference value has occurred, while the electronic device is driven using the first battery; determine that the designated event has occurred or that the first battery corresponds to the low-power state; and parallel-connect the first battery and at least one of the at least one second battery, based on determining that the designated event has occurred, or that the first battery corresponds to the low-power state.

A method for operating an electronic device according to an embodiment may be, for example, a method for operating an electronic device including at least two batteries, the method including the operations of: monitoring whether a designated event or a low-power state in which a voltage of a first battery drops below a reference value has occurred, while the electronic device is driven using the first battery; determining that the designated event has occurred or that the first battery corresponds to the low-power state; and parallel-connecting the first battery and at least one of at least one second battery, based on determining that the designated event has occurred, or that the first battery corresponds to the low-power state.

An electronic device may include, for example: a first battery; at least one second battery; a power management module configured to monitor a first output current value of the first battery while the electronic device is driven using the first battery; and a processor electrically connected to the first battery, the at least one second battery, and the power management module. The processor may be configured to: compare the first output current value with a designated first reference current value; and parallel-connect at least one of the at least one second battery with the first battery, if the first output current value is equal to or larger than the first reference current value.

Advantageous effects that can be obtained in the disclosure are not limited to the above-mentioned advantageous effects, and other advantageous effects not mentioned herein could be clearly understood by a person skilled in the art to which the disclosure pertains.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Therefore, certain embodiments described below may provide a method for stably supplying power and an electronic device therefor, which includes multiple power sources, where in the case in which a voltage drop is expected to occur to the first power source while the electronic device is driven using the first power source, or if the voltage drops below a reference value, the second power source is used, thereby guaranteeing stable power supply.

An electronic device according to certain embodiments is advantageous in that, in the case in which a voltage drop is expected to occur to the first power source while the electronic device is driven using the first power source, or if the voltage drops below a reference value, the second power source is used. This way, the power drop of the first power source is minimized, and stable power may be supplied such that components of the electronic device can exhibit optical performances.

Technical objectives to be accomplished in the disclosure are not limited to the above-mentioned technical objectives, and other technical objectives not mentioned herein could be clearly understood by a person skilled in the art to which the disclosure pertains, from the following description.

Hereinafter, various embodiments will be described with reference to the accompanying drawings.

Figure 1:
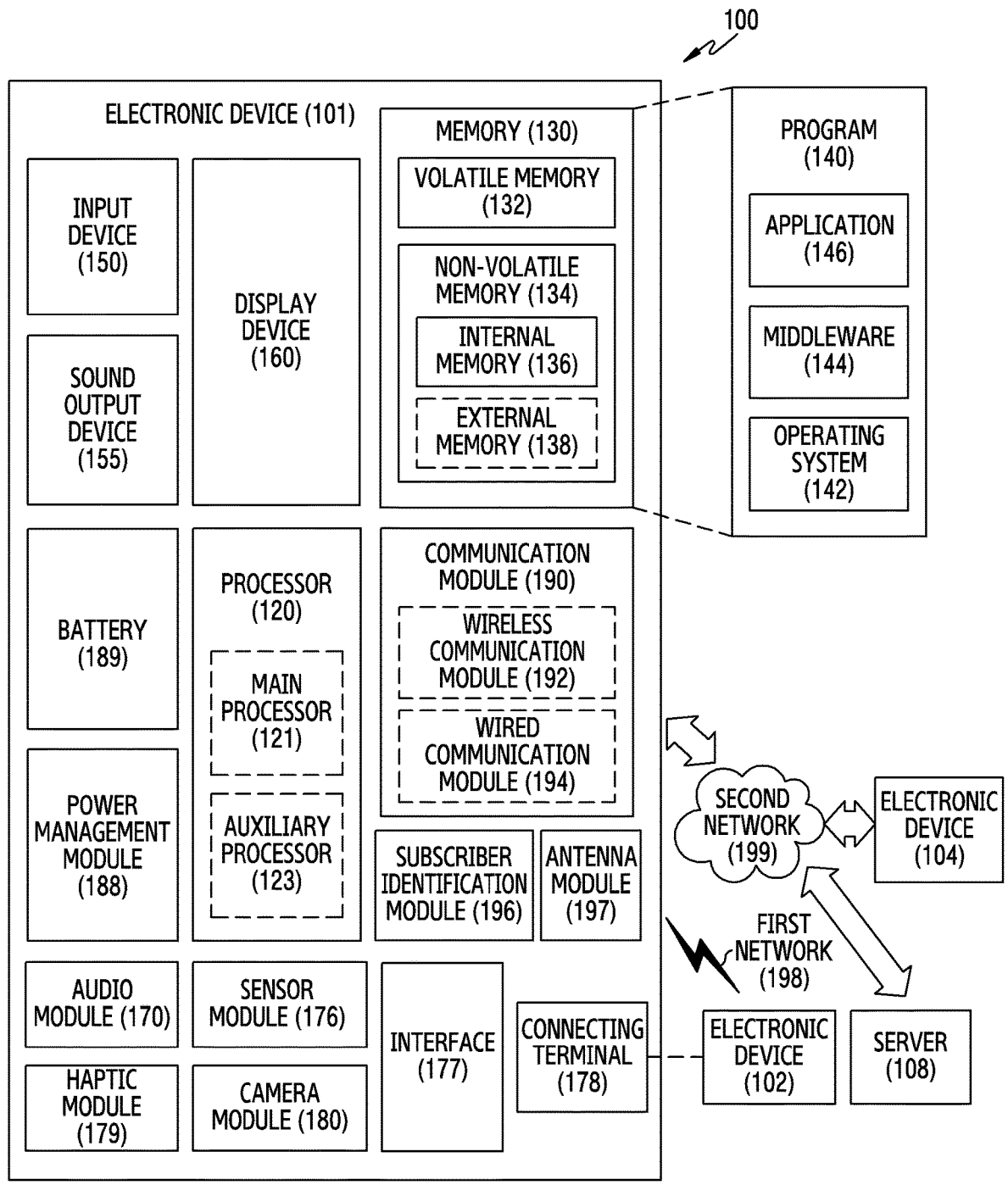
FIG. 1 illustrates an electronic device inside a network environment according to various embodiments.

FIG. 1 is a block diagram illustrating an electronic device 101 in a network environment 100 according to various embodiments.

Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2:
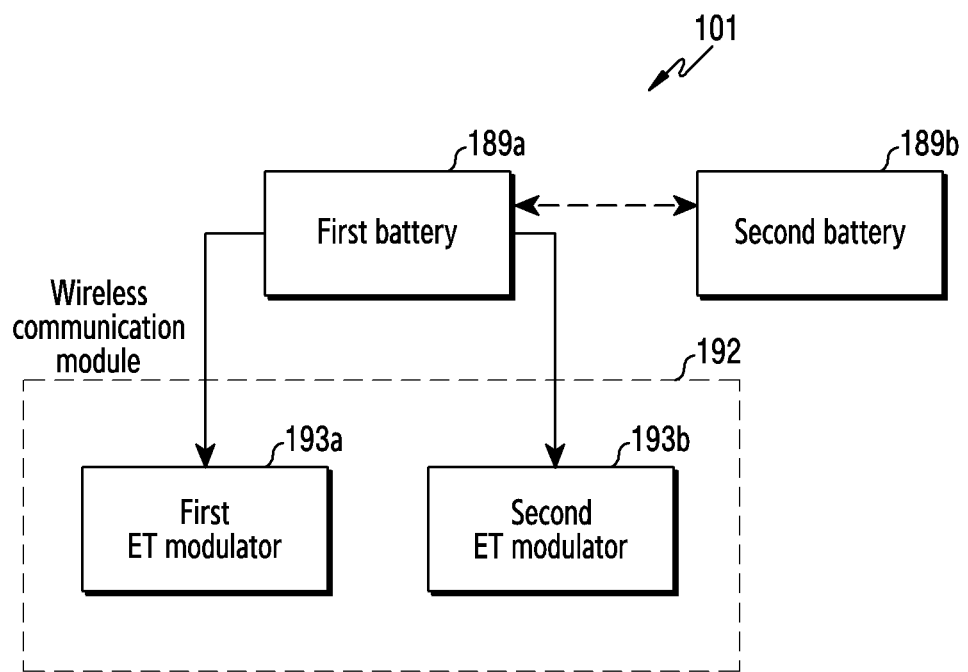
FIG. 2 is a block diagram of an electronic device according to an embodiment.

FIG. 2 is a block diagram of an electronic device according to an embodiment. Referring to FIG. 2, the electronic device 101 may include a first battery 189a, at least one second battery 189b, and a wireless communication module 192. The first battery 189a and the at least one second battery 189b may be included in the battery 189 in FIG. 1. As described above, the battery 189 in FIG. 1 may supply power to at least one component of the electronic device 101, and the first battery 189a and/or the at least one second battery 189b may both supply power to at least one component of the electronic device 101. FIG. 2 illustrates an example in which the first battery 189a or the first battery 189a and the at least one second battery 189b supply power to the wireless communication module 192 of the electronic device 101.

According to an embodiment, the first battery 189a may alone supply power to at least one component of the electronic device 101, or the first battery 189a and the at least one second battery 189b may together supply power to at least one component of the electronic device 101.

The second network 199 in FIG. 1 may include a first cellular network and a second cellular network, and the wireless communication module 192 may include a first communication processor (first CP) and a second communication processor (second CP). For example, the first CP may establish a communication channel to be used for wireless communication with the first cellular network, and may support legacy network communication through the established communication channel. According to various different embodiments, the first cellular network may be a legacy network including a $2^{nd}$ generation (2G), 3G 4G or long-term evolution (LTE) network. The second CP may establish a communication channel corresponding to a designated band (for example, about 6 GHz to about 60 GHz) to be used for wireless communication with the second cellular network, and may support 5G network communication through the established communication channel. According to an embodiment, the second cellular network may be the 5G network defined by The 3rd Generation Partnership Project (3GPP). According to an embodiment, the electronic device 101 may transmit/receive control messages and user data through legacy network communication and/or 5G network communication.

In an embodiment, the electronic device 101 may simultaneously perform, based on E-UTRA-NR dual connectivity (EN-DC), communication with a first base station using the first CP and communication with a second base station using the second CP. The EN-DC may refer to a technology for simultaneously connecting to different cellular networks (for example, LTE communication network based on LTE and New Radio (NR) communication network based on NR) by using multiple CPs (for example, first CP corresponding to first radio access technologies (RAT) and second CP corresponding to second RAT), where the RATs are different (for example, first RAT corresponding to LTE and second RAT corresponding to NR).

According to an embodiment, the wireless communication module 192 may include a first envelope tracking (ET) modulator 193a for legacy network communication and a second ET modulator 193b for 5G network communication. When the first ET modulator 193a is driven using the first battery 189a while the display (display device 160 in FIG. 1) is turned off, an average current of 500 mA may be consumed from the first battery 189a. In the case of the EN-DC, if the first ET modulator 193a and the second ET modulator 193b are driven using the first battery 189a, an average current of 800 mA may be consumed when the display is turned off, an average current of 900 mA may be consumed when the display is turned on, and a peak current of 1.5 A may be reached even when the display is turned off. That is, in the case of the EN-DC, during 5G data transmission, the increase in the current needed by the first ET modulator 193a and the second ET modulator 193b may cause a near-instantaneous abrupt decrease in the voltage supplied from the first battery 189a (voltage drop phenomenon), and such a voltage drop may degrade the communication performance because the first ET modulator 193a and the second ET modulator 193b fail to receive sufficient power supplied thereto.

According to an embodiment, the electronic device 101 may parallel-connect the first battery 189a and at least one of the at least one second battery 189b, before the voltage drop phenomenon occurs, such that stable power is supplied to the first ET modulator 193a and the second ET modulator 193b. The first ET modulator 193a and the second ET modulator 193b, which are supplied with stable power, may supply power to the legacy transmission system and the 5G NR transmission system, respectively, such that the electronic device 101 can properly transmit 5G data even in the case of the EN-DC.

According to an embodiment, if the voltage drop phenomenon occurs, the electronic device 101 may parallel-connect the first battery 189a and at least one of the at least one second battery 189b, thereby supplying stable power to the first ET modulator 193a and the second ET modulator 193b.

FIG. 2 illustrates an example in which at least one of the second batteries 189b is parallel-connected before a voltage drop occurs in the first battery 189a, based on the assumption that, if the electronic device 101 performs 5G data transmission operation by using power supplied from the first battery 189a, such an operation corresponds to a designated event in which necessary power is expected to increase. The electronic device 101 according to various embodiments is capable of performing various functions, and the designated event in which necessary power is expected to increase if the electronic device 101 performs certain functions is not limited to the above example, and various other examples may exist.

The following description with reference to FIG. 1 and FIG. 2 will be directed to the occurrence of a designated event in which necessary power is expected to increase while the electronic device 101 is driven using the first battery 189a, and a method for supplying power in response to the occurrence of the designated event. The designated event in which necessary power is expected to increase is where a voltage drop may occur to the first battery 189a. This may occur while the electronic device 101 according to an embodiment is driven using the first battery 189a and performing functions such as 5G data transmission, a camera flash operation, a dual speaker amplification operation, a wireless charging power transmission operation, and a magnetic secure transmission operation.

In an embodiment, 5G data transmission is performed by the wireless communication module 192 inside the communication module 190 as described above, and a large amount of current may be consumed to amplify the signal for transmitting/receiving 5G data. In this case, the processor 120 may monitor control signals for transmitting/receiving 5G data, thereby determining the occurrence of the 5G data transmission operation. The processor 120 may include a microprocessor or any suitable type of processing circuitry, such as one or more general-purpose processors (e.g., ARM-based processors), a Digital Signal Processor (DSP), a Programmable Logic Device (PLD), an Application-Specific Integrated Circuit (ASIC), a Field-Programmable Gate Array (FPGA), a Graphical Processing Unit (GPU), a video card controller, etc. In addition, it would be recognized that when a general purpose computer accesses code for implementing the processing shown herein, the execution of the code transforms the general purpose computer into a special purpose computer for executing the processing shown herein. Certain of the functions and steps provided in the Figures may be implemented in hardware, software or a combination of both and may be performed in whole or in part within the programmed instructions of a computer. No claim element herein is to be construed under the provisions of 35 U.S.C. § 112(f), unless the element is expressly recited using the phrase "means for." In addition, an artisan understands and appreciates that a "processor" or "microprocessor" may be hardware in the claimed disclosure. Under the broadest reasonable interpretation, the appended claims are statutory subject matter in compliance with 35 U.S.C. § 101.

In an embodiment, wireless charging power transmission refers to an operation of supplying power to an external electronic device 102 through a wireless power transmitting/receiving circuit of a power management module, and AC power may be output through a predetermined pin of the wireless power transmitting/receiving circuit. In this case, the processor 120 may monitor whether or not a wireless charging power transmission operation occurs through serial communication with the wireless power transmitting/receiving circuit, thereby determining the occurrence of the operation.

In an embodiment, magnetic secure transmission refers to a data transmission operation related to electronic payment, and may be operated by means of a control signal delivered by the power management module 188. The transmission may be implemented by a data signal delivered by a short-range communication module of the wireless communication module 192. In this case, a large amount of power is necessary to form the required magnetic field, and the processor 120 may monitor the control signal and the data signal, thereby determining the occurrence of the magnetic secure transmission operation based on the occurrence of the signals.

In an embodiment, a camera flash may occur if a flash activation signal is delivered from a camera application to a CAM PMIC inside a camera module. In this case, a large amount of power may be consumed to operate the flash, and the processor 120 may monitor the flash activation signal, thereby determining whether or not the camera flash operation occurs based on the occurrence of the signal.

In an embodiment, the electronic device 101 may include a receiver amplifier and a speaker amplifier, and each of the receiver amplifier and the speaker amplifier may be controlled by a communication interface. An instantaneous or near-instantaneous peak current may occur when the receiver amplifier and the speaker amplifier are operated simultaneously (dual speaker amplification operation). In this case, the processor 120 may monitor signals from the communication interfaces, thereby determining whether or not the dual speaker amplification operation occurs.

The processor 120 according to an embodiment may monitor for the designated event in which necessary power is expected to increase while the electronic device 101 is driven using the first battery 189a, and may determine whether or not the designated event has occurred. The processor 120 may parallel-connect the first battery 189a and at least one of the second batteries 189b, based on determining that the designated event has occurred. A voltage drop may occur to the first battery 189a if the total current output by the first battery 189a increases, or if the peak current rises abruptly, as the result of the occurrence of the designated event in which necessary power is expected to increase while the electronic device 101 is driven using the first battery 189a. The electronic device 101 according to an embodiment may parallel-connect the first battery 189a and the second battery 189b before the voltage drop occurs to the first battery 189a, thereby minimizing the voltage drop, and supplying stable power such that respective components can function properly.

The processor 120 according to an embodiment may monitor for the designated event in which necessary power is expected to increase while the electronic device 101 is driven using the first battery 189a and at least one of the second batteries 189b parallel-connected the first battery 189a, and may determine whether or not the designated event has ended. The processor 120 may release the parallel connection between the first battery 189a and at least one of the second battery 189b, based on determining that the designated event in which necessary power is expected to increase has ended.

The electronic device 101 according to an embodiment may operate in the same manner when the voltage of the first battery 189a drops below a reference value (low-power state) as when the designated event in which necessary power is expected to increase has occurred. The power management module 188 may monitor capacity information of the first battery 189a and the voltage thereof, through a power management integrated circuit (PMIC), and may deliver the result of monitoring to the processor 120. The processor 120 according to an embodiment may monitor, while the electronic device 101 is driven using the first battery 189a, whether or not the voltage of the first battery 189a drops below a reference value (referred to as a low-power state), based on the result of monitoring delivered by the power management module 188, and may determine whether or not the voltage of the first battery 189a corresponds to the low-power state. The processor 120 may parallel-connect the first battery 189a and at least one of the second battery 189b, based on determining that the first battery 189a corresponds to the low-power state.

The processor 120 according to an embodiment may monitor whether or not the low-power state of the first battery 189a ends, while the electronic device 101 is driven using the first battery 189a and at least one of the second batteries 189b parallel-connected to the first battery 189a, and may determine that the first battery 189a is not in the low-power state if the voltage of the first battery 189a exceeds a reference value and thus is restored. The processor 120 may release the parallel connection between the first battery 189a and at least one of the second battery 189b, based on determining that the first battery 189a is not in the low-power state.

Figure 3:
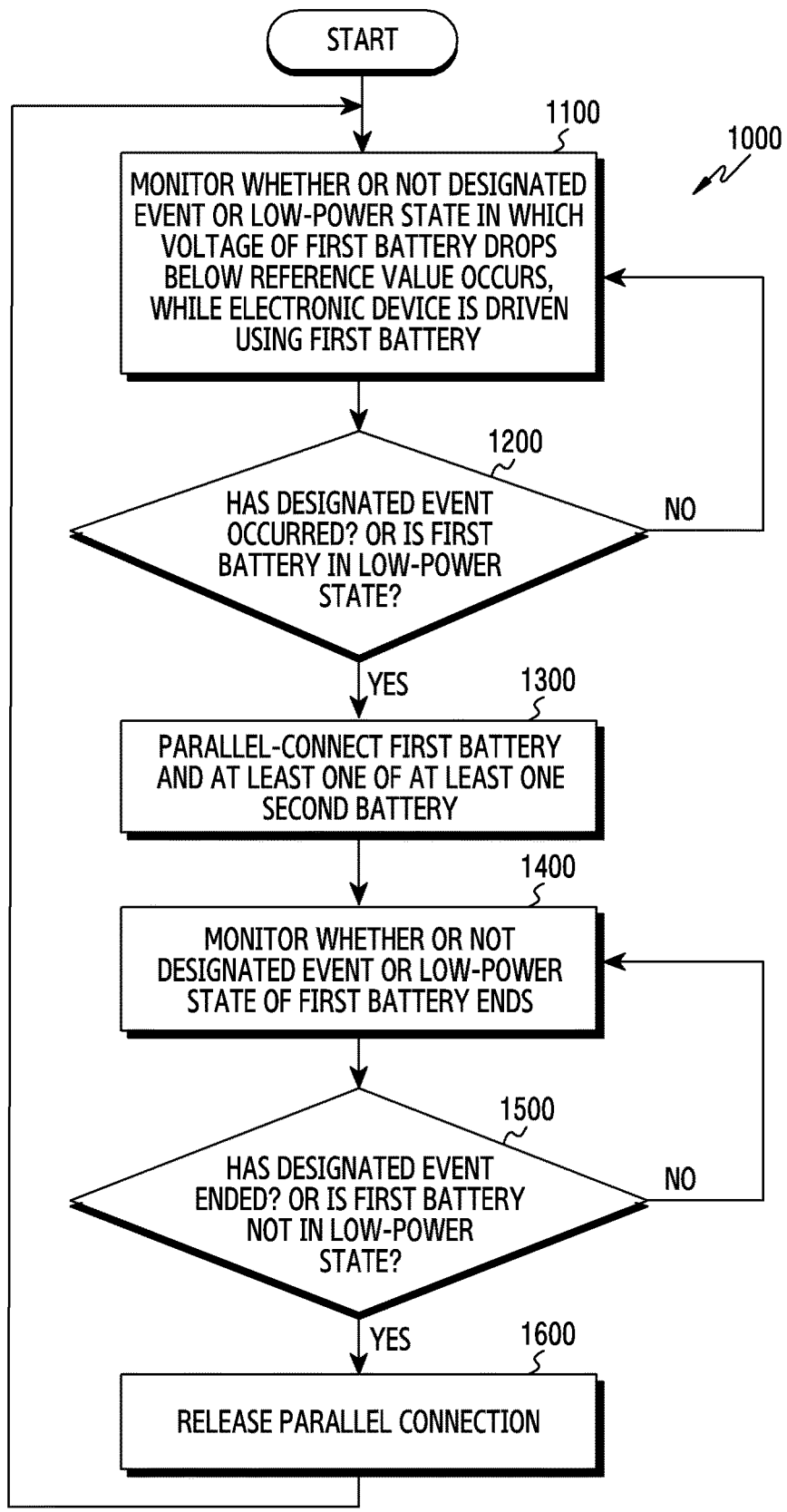
FIG. 3 is a flowchart illustrating a method for operating an electronic device according to an embodiment.

FIG. 3 is a flowchart illustrating a method for operating an electronic device according to an embodiment. FIG. 3 illustrates a method 1000 in which an electronic device (for example, electronic device 101 in FIG. 1 and FIG. 2) including a first battery and at least one second battery for stably supplying power to other components of the electronic device. The operation procedure as in FIG. 3 may be controlled by the processor 120 in FIG. 1.

Referring to FIG. 3, in operation 1100, the electronic device may monitor, while being driven using the first battery 189a, whether or not a designated event in which necessary power is expected to increase occurs, or whether or not a low-power state in which the voltage of the battery 189a drops below a reference value occurs. The processor 120 of the electronic device may be electrically connected to a power management module 188, a communication module 190, a camera module 180, a sound output device 155, a memory 130, and the like, and may sense the occurrence of the designated event in which necessary power is expected to increase as a result of serial communication or the like, and may sense the low-power state as a result of a control signal or a data signal related to the low-power state of the first battery 189a. This way, the electronic device may monitor whether or not the designated event in which necessary power is expected to increase occurs, or whether or not the first battery 189a is in the low-power state. For example, the operation of monitoring whether or not the designated event occurs may include an operation of identifying whether or not 5G data transmission, camera flash operation, dual speaker amplification, wireless charging power transmission, and magnetic secure transmission are activated.

The electronic device may determine, in operation 1200, whether or not the designated event in which necessary power is expected to increase has occurred, or whether or not the first battery 189a corresponds to a low-power state. The electronic device may perform operation 1300 if the designated event has occurred, or if the first battery 189a corresponds to the low-power state, and may return to operation 1100 if the designated event has not occurred, or if the first battery 189a does not correspond to the low-power state.

The electronic device may parallel-connect the first battery 189a and at least one of the second batteries 189b, based on determining that the designated event in which necessary power is expected to increase has occurred, or that the first battery 189a corresponds to the low-power state, in operation 1300.

The electronic device may monitor, while being driven using the first battery 189a and at least one of the second battery 189b parallel-connected to the first battery 189a, whether or not the designated event in which necessary power is expected to increase has ended, or whether or not the low-power state of the first battery has ended, in operation 1400. The processor 120 of the electronic device may sense the ending of the designated event as a result of serial communication or the like, and may sense the end of the low-power state as a result of a control signal or a data signal related to the low-power state of the first battery 189a. This way, the electronic device may monitor whether or not the designated event has ended, or whether or not the low-power state of the first battery 189a has ended.

The electronic device may determine, in operation 1500, whether or not the designated event in which necessary power is expected to increase has ended, or whether or not the first battery 189a is not in the low-power state. The electronic device may perform operation 1600 if the designated event has ended, or if the first battery 189a is not in the low-power state, and may return to operation 1400 if the designated event has not ended, or if the first battery 189a is still in the low-power state.

The electronic device may release the parallel connection between the first battery 189a and at least one of the at least one second battery 189b, based on determining that the designated event in which necessary power is expected to increase has ended, or that the first battery 189a is not in the low-power state, in operation 1600.

Figure 4:
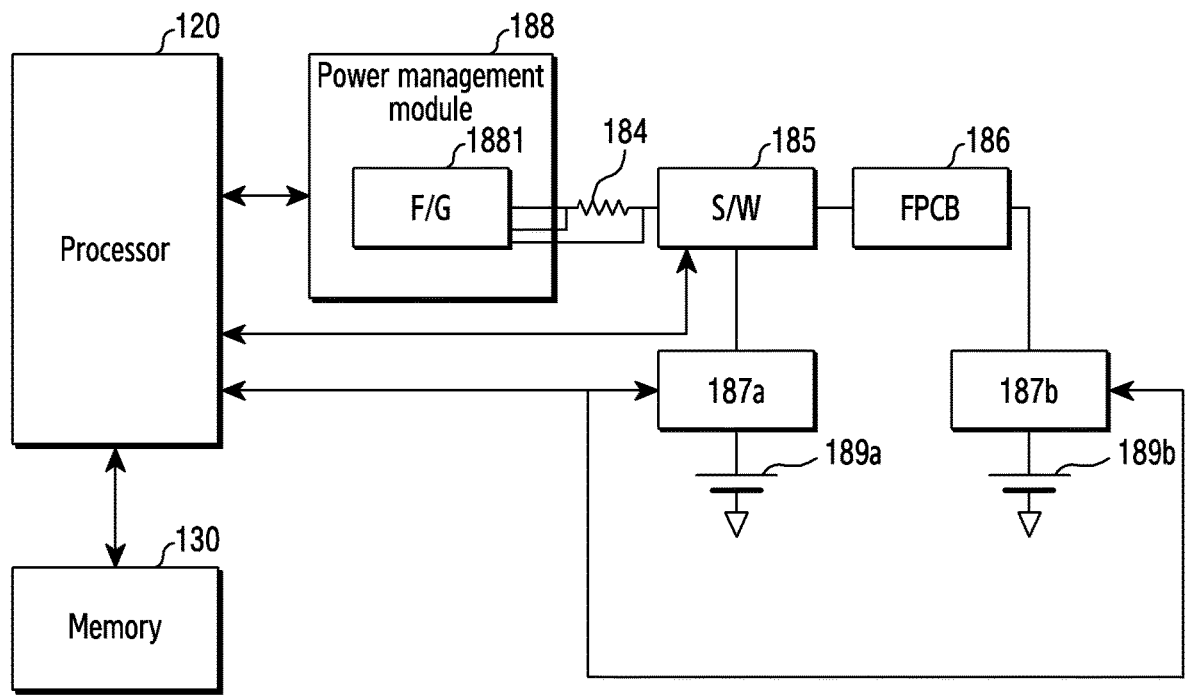
FIG. 4 is a detailed block diagram illustrating a more detailed configuration of an electronic device according to an embodiment.

FIG. 4 is a detailed block diagram illustrating a more detailed configuration of an electronic device according to an embodiment. Referring to FIG. 4, the electronic device 101 according to an embodiment may include a first battery 189a, a second battery 189b, a power management module 188, a memory 130, and a processor 120. The first battery 189a and the second battery 189b may be secondary batteries that can be charged/discharged. The first battery 189a may be the main power source of the electronic device 101 and may supply power to components of the electronic device, and the second battery 189b may be an auxiliary power source of the electronic device 101. A flexible printed circuit board (FPCB) 186 may be used to provide a path connecting the output end of the first battery 189a and the output end of the second battery 189b such that, although the first battery 189a and the second battery 189b are not connected in normal cases, the first battery 189a and the second battery 189b can be parallel-connected to each other if necessary. In addition, the first battery 189a and the second battery 189b may have a first battery management unit 187a and a second battery management unit 187b, respectively, as safety devices for guaranteeing that charging/discharging currents flow in the batteries within allowable ranges.

The power management module 188 may control charging/discharging of the batteries, may monitor the capacity of the batteries and supply voltage information, and may deliver monitoring information to the processor 120. The power management module 188 may include a fuel gauge 1881 (F/G) as a low-level component, and the fuel gauge 1881 may monitor charging/discharging currents of the batteries and capacity information of the batteries.

The electronic device 101 according to an embodiment may further include a resistor 184, and the resistor 184 may be provided between the output end of the first battery 189a and the fuel gauge 1881 such that the entire current output from the first battery 189a can flow through the same. The fuel gauge 1881 may measure the voltage across both ends of the resistor by using two pins, thereby monitoring a first output current value that is output from the first battery 189a. The power management module 188 may transfer the first output current value monitored by the fuel gauge 1881 to the processor 120.

The electronic device 101 according to an embodiment may further include a switch 185, and the switch 185 may be provided between the output end of the first battery, the power management module 188, and the output end of the second battery such that the first battery 189a and the second battery 189b can be parallel-connected if necessary. In addition, the switch 185 may be turned on/off under the control of the processor 120 so as to connect or disconnect the first battery 189a and the second battery 189b.

In an embodiment, the processor 120 may transmit/receive data signals and control signals, through serial communication, to or from the first battery 189a, the second battery 189b, and the power management module 188. While the electronic device 101 is driven using the first battery 189a, the processor 120 may receive the first output current value of the first battery 189a from the power management module 188, and may compare the first output current value with a predesignated first reference current value, thereby monitoring the occurrence of the designated event in which necessary power is expected to increase. The designated event in which necessary power is expected to increase, as used herein, may occur due to the execution of operations such as 5G data transmission operation, camera flash operation, dual speaker amplification operation, wireless charging power transmission operation, and magnetic secure transmission operation. If the designated event in which necessary power is expected to increase occurs, the total amount of current that is output from the first battery and/or the peak current value thereof may increase, and the supply voltage from the first battery may abruptly drop. That is, the voltage drop phenomenon may occur.

In an embodiment, the processor 120 may determine that designated event in which necessary power is expected to increase has occurred if the first output current value is equal to/higher than the predesignated first reference current value. The processor 120 may parallel-connect the first battery 189a and the second battery 189b, based on determining that the event has occurred. In this case, the processor 120 may deliver a control signal to the switch 185 such that the switch 185 is turned on (i.e. closed), thereby parallel-connecting the first battery 189a and the second battery 189b. The processor 120 may parallel-connect the first battery 189a and the second battery 189b before the voltage drop occurs to the first battery 189a, thereby minimizing the voltage drop by increasing the total capacity of the power supply, and supplying stable power such that the components of the electronic device can optimally perform.

In an embodiment, the processor 120 may receive the supply voltage value of the first battery 189a from the power management module 188 while the electronic device 101 is driven using the first battery 189a. The processor 120 may compare the supply voltage value of the first battery 189a with a predesignated under-voltage lock-out threshold (UVLO). The processor 120 may determine that, if the supply voltage value of the first battery 189a drops below the UVLO voltage, a voltage drop has occurred to the first battery, and may parallel-connect the first battery 189a and the second battery 189b.

While the electronic device 101 is driven using the first battery 189a and the second battery 189b parallel-connected to the first battery 189a, the processor 120 according to an embodiment may receive a second output current of the first battery 189a and the second battery 189b parallel-connected to the first battery 189a from the power management module 188, and may compare the second output current value with a predesignated second reference current value, thereby monitoring whether or not the designated event in which necessary power is expected to increase has ended. The processor 120 may determine that, if the second output current value is equal to/lower than the predesignated second reference value, the designated event in which necessary power is expected to increase has ended. The second reference current value may be configured to be smaller than the first reference current value.

The processor 120 according to an embodiment may release the parallel connection between the first battery 189a and the second battery 189b, based on determining that the event has ended. In this case, the processor 120 may deliver a control signal to the switch 185 such that the switch 185 is turned off (i.e. opened), thereby releasing parallel connection between the first battery 189a and the second battery 189b. If the first battery 189a and the second battery 189b are always connected, a current of 100 µA to 200 µA may be consumed. This may reduce the battery life of the electronic device. Accordingly, the processor 120 may be configured to parallel-connect the first battery 189a and the second battery 189b or to release the connection in response to the occurrence of the designated event in which necessary power is expected to increase.

In an embodiment, while the electronic device 101 is driven using the first battery 189a, the processor 120 may receive a voltage value of the first battery 189a from the power management module 188, and may compare the voltage value of the first battery 189a with a predesignated reference value, thereby monitoring whether or not the first battery 189a corresponds to the low-power state. The processor 120 may determine that, if the voltage value of the first battery 189a is equal to/lower than the predesignated reference value, the first battery 189a is in the low-power state. The processor 120 may parallel-connect the first battery 189a and the second battery 189b, based on determining that the first battery 189a is in the low-power state. In this case, the processor 120 may deliver a control signal to the switch 185 such that the switch 185 is turned on, thereby parallel-connecting the first battery 189a and the second battery 189b.

Figure 5A:
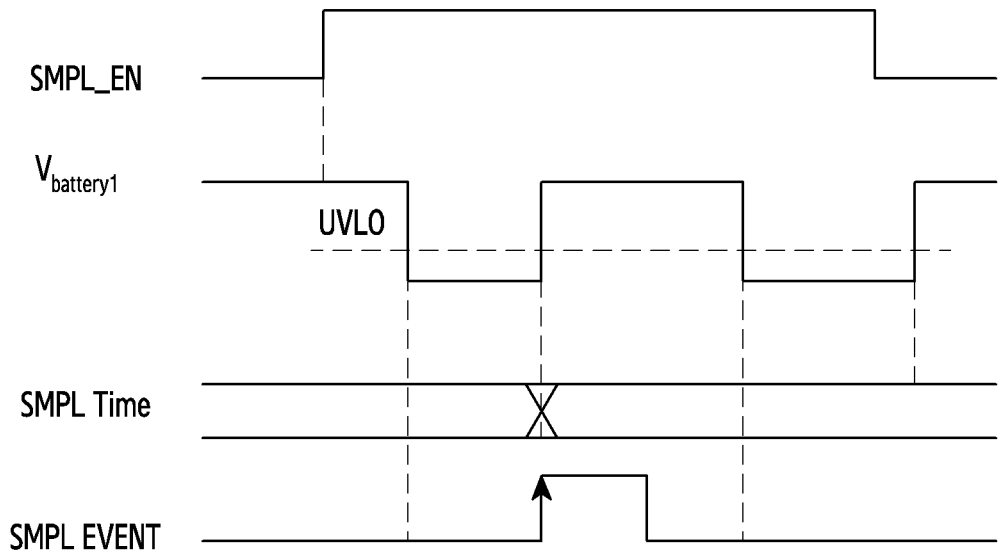
FIG. 5A is a voltage timing diagram illustrating when an electronic device is driving using a first battery according to an embodiment.

While the electronic device 101 is driven using the first battery 189a and the second battery 189b parallel-connected to the first battery 189a, the processor 120 according to an embodiment may receive a voltage value of the first battery 189a from the power management module 188, and may compare the voltage value of the first battery 189a with a predesignated second reference current value, thereby monitoring whether or not the first battery 189a corresponds to the low-power state. The processor 120 may determine that, if the voltage value of the first battery 189a exceeds the predesignated second reference value, the first battery 189a is not in the low-power state. The processor 120 may release the parallel connection between the first battery 189a and the second battery 189b, based on determining that the first battery 189a is not in the low-power state. In this case, the processor 120 may deliver a control signal to the switch 185 such that the switch 185 is turned off, thereby releasing the parallel connection between the first battery 189a and the second battery 189b. If the first battery 189a and the second battery 189b are always connected, a current of 100 µA to 200 µA may be consumed. Accordingly, the processor 120 may be configured to connect the first battery 189a and the second battery 189b or to release the connection according to whether or not the first battery 189a corresponds to the low-power state and in response to the occurrence of a designated event. FIG. 5A is a voltage timing diagram illustrating when an electronic device is driving using a first battery, and FIG. 5B is a voltage timing diagram illustrating when the electronic device is driving using the first battery and a second battery.

Referring to FIG. 5A, if the designated event in which necessary power is expected to increase occurs while the electronic device (for example, electronic device 101 in FIG. 1, FIG. 2, and FIG. 4) is driven using the first battery 189a, the total current that is output from the first battery 189a rises (SMPL_EN). If the current that is output from the first battery 189a increases, the supply voltage $V_{battery1}$ of the first battery 189a may drop below an under-voltage lock-out threshold (UVLO) and may maintain the value for a predetermined time period. That is, the voltage drop phenomenon may occur. The designated event in which necessary power is expected to increase may occur due to the execution of operations such as 5G data transmission operation, camera flash operation, dual speaker amplification operation, wireless charging power transmission operation, and magnetic secure transmission operation. If the voltage drop phenomenon of the first battery 189a is maintained for the predetermined time period, the electronic device executes a sudden momentary power loss (SMPL) event after the predetermine time period has passed.

Figure 5B:
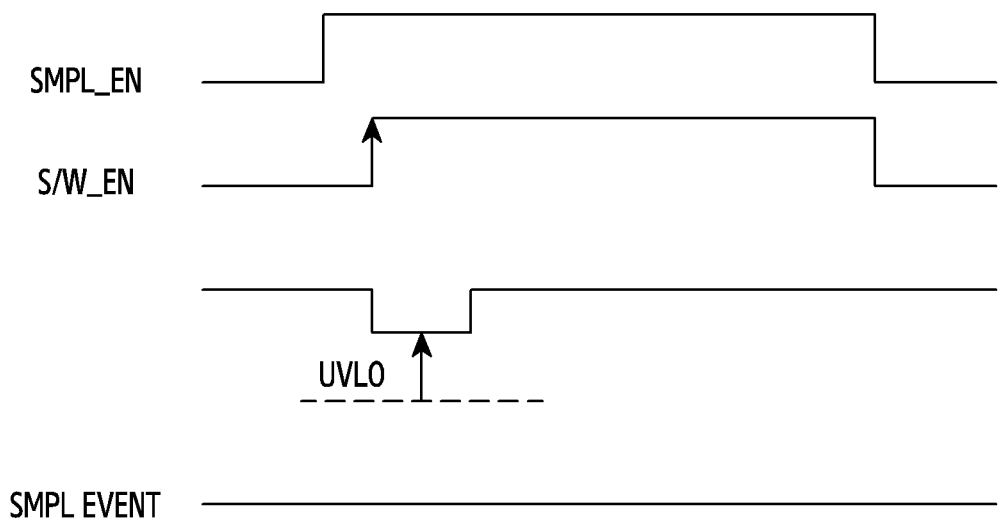
FIG. 5B is a voltage timing diagram illustrating when the electronic device is driving using the first battery and a second battery according to an embodiment.

Referring to FIG. 5B, if a designated event in which necessary power is expected to increase occurs while the electronic device is driven using the first battery 189a, and if the total current that is output from the first battery rises (SMPL_EN), the electronic device may parallel-connect (S/W_EN) the first battery 189a and the second battery 189b through the switch. The total impedance of the formed electric path, including the first battery and the second battery, may accordingly decrease, and the supply voltage of the first battery may return to be above the UVLO. In addition, the electronic device may be able to perform all operations included in the electronic device, without having a sudden momentary power loss (SMPL) event.

Figure 6:
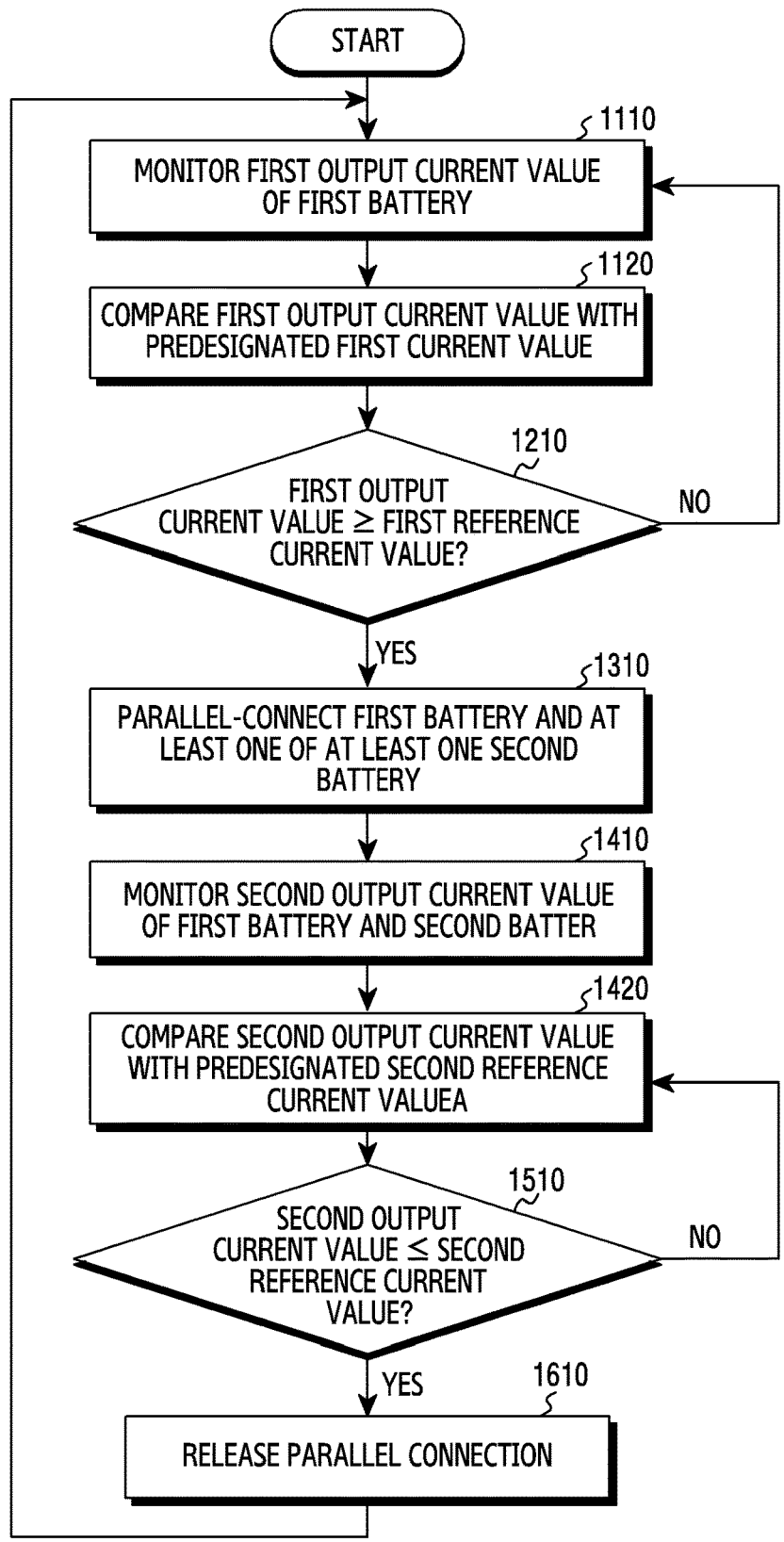
FIG. 6 is a flowchart illustrating a method for operating an electronic device according to an embodiment.

FIG. 6 is a flowchart illustrating a method for operating an electronic device according to an embodiment. FIG. 6 illustrates a method in which an electronic device (for example, electronic device 101 in FIG. 1, FIG. 2 and FIG. 4) including a first battery and a second battery stably supplies power to the components of the electronic device. The operation procedure as in FIG. 6 may be controlled by the processor 120 in FIG. 4.

Referring to FIG. 6, in operation 1110, the electronic device may monitor a first output current value of the first battery 189a while being driven using the first battery 189a. The electronic device may include a resistor 184 provided between the output end of the first battery 189a and the power management module 188, and may measure the voltage across both ends of the resistor, thereby monitoring the first output current value of the first battery 189a.

In operation 1120, the electronic device may compare the first output current value with a predesignated first reference current value, thereby monitoring the occurrence of a designated event in which necessary power is expected to increase.

In operation 1210, the electronic device may determine that, if the first output current value is equal to/larger than the predesignated first reference current value, the designated event in which necessary power is expected to increase has occurred, and may perform operation 1310. If the first output current value is below the predesignated first reference current value, the electronic device may determine that the designated event in which necessary power is expected to increase has not occurred, and may return to operation 1110.

In operation 1310, the electronic device may parallel-connect the first battery 189a and the second battery 189b, based on determining that the designated event in which necessary power is expected to increase has occurred. In this case, the electronic device may deliver a control signal to the switch 185 such that the switch 185 is turned on, thereby parallel-connecting the first battery 189a and the second battery 189b. The electronic device may parallel-connect the first battery 189a and the second battery 189b before a voltage drop occurs to the first battery 189a, thereby minimizing the voltage drop by increasing the total capacity of the power supply, and supplying stable power such that components of the electronic device can optimally perform.

In operation 1410, the electronic device may monitor a second output current value of the first battery 189a and the second battery 189b parallel-connected to the first battery 189a, while being driven using the first battery 189a and the second battery 189b parallel-connected to the first battery 189a.

In operation 1420, the electronic device may compare the second output current value with a predesignated second reference value, thereby monitoring whether or not the designated event in which necessary power is expected to increase has ended. The second reference current value may be configured to be smaller than the first reference current value.

In operation 1510, the electronic device may determine that, if the second output current value is equal to/lower than the predesignated second current value, the designated event in which necessary power is expected to increase has ended, and may perform operation 1610. If the second output current value exceeds the predesignated second reference current value, the electronic device may determine that designated event in which necessary power is expected to increase has not ended, and may return to operation 1420.

In operation 1610, the electronic device may release the parallel connection between the first battery 189a and the second battery 189b, based on determining that the event has ended. In this case, the processor 120 may deliver a control signal to the switch 185 such that the switch 185 is turned off, thereby releasing parallel connection between the first battery 189a and the second battery 189b. If the first battery 189a and the second battery 189b are always connected, a current of 100 μA to 200 μA may be consumed. Accordingly, the electronic device may be configured to parallel-connect the first battery 189a and the second battery 189b or to release the connection in response to the occurrence of the designated event in which necessary power is expected to increase.

Figure 7:
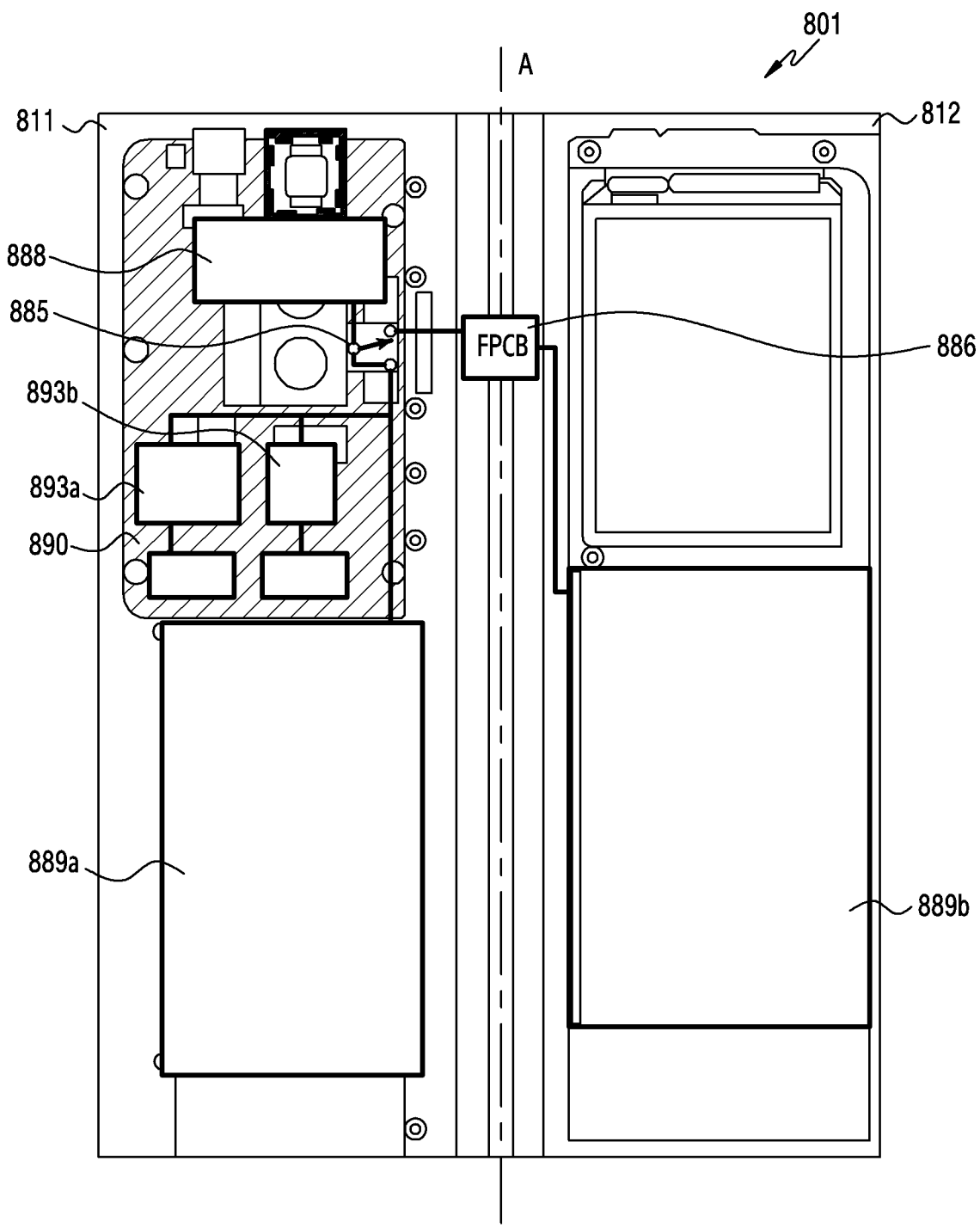
FIG. 7 is an exemplary rear view illustrating the disposition of an electronic device according to an embodiment.

FIG. 7 is an exemplary rear view illustrating the internal disposition of an electronic device according to an embodiment.

Referring to FIG. 7, the electronic device may include a housing 801, a first battery 889a (for example, first battery 189a in FIG. 4), a second battery 889b (for example, second battery 189b in FIG. 4), and a printed circuit board 890. The housing may include a first housing structure 811 and a second housing structure 812, and may be a foldable housing. The first housing structure 811 and the second housing structure 812 may be disposed symmetrically on both sides with reference to a folding axis, and may be able to rotate around the folding axis (axis A). In the illustrated embodiment, the disposition of internal components of the electronic device 801 is illustrated in a state in which the first housing structure 811 and the second housing structure 812 are unfolded with respect to each other. The first housing structure 811 and the second housing structure 812 may form a space in which components (for example, printed circuit board or battery) of the electronic device 801 can be disposed. For example, the first battery 889a may be disposed in a space formed in the first housing structure 811, and the second battery 889b may be disposed in a space formed in the second housing structure 812.

In an embodiment, the printed circuit board 890 may have components for implementing various functions of the electronic device mounted thereon, and may have a wireless communication module (for example, wireless communication module 192 in FIG. 1 and FIG. 2), a power management module 888 (for example, power management module 188 in FIG. 1 and FIG. 4), and a switch 885 (for example, switch 185 in FIG. 4) mounted thereon. The wireless communication module may include a first ET modulator 893a configured to supply power to a legacy transmission circuit for legacy network communication and a second ET modulator 893b configured to supply power to 5G NR transmission circuit for 5G network communication. For example, if the first ET modulator 893a alone operates, the first ET modulator 893a may be supplied with power from the first battery 889a and the power management module 888. If the first ET modulator 893a and the second ET modulator 893b operate simultaneously (that is, in the case of EN-DC), the same may be supplied with power from the first battery 889a, the second battery 889b parallel-connected to the first battery 889a, and the power management module 888. In this case, the printed circuit board 890 may further include a switch 885, and the switch 885 may be provided between the output end of the first battery 889a, the power management module 888, and the output end of the second battery 889b so as to parallel-connect the first battery 889a and the second battery 889b.

In an embodiment, the electronic device 801 may have an FPCB 886 provided to serve as the path connecting the output end of the first battery 189*a* and the output end of the second battery 189*b* such that the first battery 189*a* and the second battery 189*b* can be parallel-connected to each other.

As described above, an electronic device according to an embodiment may include: a first battery; at least one second battery; a power management module configured to monitor capacity information of the first battery; and a processor electrically connected to the first battery, the at least one second battery, and the power management module. The processor may be configured to: monitor whether a designated event or a low-power state in which a voltage of the first battery drops below a reference value has occurred, while the electronic device is driven using the first battery; determine that the designated event has occurred or that the first battery corresponds to the low-power state; and parallel-connect the first battery and at least one of the at least one second battery, based on determining that the designated event has occurred, or that the first battery corresponds to the low-power state.

In an embodiment, the processor may be configured to: monitor whether the designated event or the low-power state of the first battery has ended, in a state in which the first battery and at least one of the at least one second battery are parallel-connected; determine that the designated event has ended, or that the first battery does not correspond to the low-power state; and release the parallel connection, based on determining that the designated event has ended, or that the first battery does not correspond to the low-power state.

In an embodiment, the designated event may be execution of at least one of a 5G data transmission operation, a camera flash operation, a dual speaker amplification operation, a wireless charging power transmission operation, and a magnetic secure transmission operation. The processor may be configured to monitor whether the 5G data transmission operation, the camera flash operation, the dual speaker amplification operation, the wireless charging power transmission operation, and the magnetic secure transmission operation has occurred.

In an embodiment, the power management module may be configured to monitor a first output current value of the first battery. The processor may be configured to: compare the first output current value of the first battery with a predesignated first reference current value; and determine that the designated event has occurred, if the first output current value is equal to or larger than the first reference current value.

In an embodiment, the power management module may be configured to monitor a second output current value of the first battery and at least one of the at least one second battery parallel-connected to the first battery. The processor may be configured to compare the second output current value with a designated second reference current value and to determine that the designated event has ended, if the second output current value is equal to or smaller than the second reference current value. The second reference current value may be smaller than the first reference current value.

In an embodiment, the electronic device may further include a resistor provided between an output end of the first battery and the power management module. The power management module may be configured to monitor the first output current value by measuring a voltage across both ends of the resistor.

In an embodiment, the electronic device may further include a switch provided between an output end of the first battery, the power management module, and an output end of the at least one second battery. The processor may be configured to parallel-connect the first battery and at least one of the at least one second battery by controlling the switch.

In an embodiment, the electronic device may further include a housing including a first housing structure and a second housing structure. The first battery may be disposed in a space formed in the first housing structure. The at least one second battery may be disposed in a space formed in the second housing structure.

In an embodiment, the housing may be a foldable housing.

As described, an electronic device according to an embodiment may include: a first battery; at least one second battery; a power management module configured to monitor a first output current value of the first battery while the electronic device is driven using the first battery; and a processor electrically connected to the first battery, the at least one second battery, and the power management module. The processor may be configured to: compare the first output current value with a designated first reference current value; and parallel-connect at least one of the at least one second battery with the first battery, if the first output current value is equal to or larger than the first reference current value.

In an embodiment, the power management module may be configured to monitor a second output current value of the first battery and at least one of the at least one second battery parallel-connected to the first battery. The processor may be configured to compare the second output current value with a designated second reference current value and to release the parallel connection if the second output current value is equal to or smaller than the second reference current value. The second reference current value may be smaller than the first reference current value.

In an embodiment, the electronic device may further include a resistor provided between an output end of the first battery and the power management module. The power management module may be configured to monitor the first output current value by measuring a voltage across both ends of the resistor.

In an embodiment, the electronic device may further include a switch provided between an output end of the first battery, the power management module, and an output end of the at least one second battery. The processor may be configured to parallel-connect the first battery and at least one of the at least one second battery by controlling the switch.

As described above, a method for operating an electronic device may include the operations of: monitoring whether a designated event or a low-power state in which a voltage of a first battery drops below a reference value has occurred, while the electronic device is driven using the first battery; determining that the designated event has occurred or that the first battery corresponds to the low-power state; and parallel-connecting the first battery and at least one of at least one second battery, based on determining that the designated event has occurred, or that the first battery corresponds to the low-power state.

In an embodiment, the method may further include the operations of: monitoring whether the designated event or the low-power state of the first battery has ended, in a state in which the first battery and at least one of the at least one second battery are parallel-connected; determining that the designated event has ended, or that the first battery does not correspond to the low-power state; and releasing the parallel connection, based on determining that the designated event has ended, or that the first battery does not correspond to the low-power state.

In an embodiment, the designated event may be execution of a 5G data transmission operation, a camera flash operation, a dual speaker amplification operation, a wireless charging power transmission operation, and/or a magnetic secure transmission operation.

In an embodiment, the operation of monitoring whether the designated event has occurred may include an operation of monitoring a first output current value of the first battery.

In an embodiment, the operation of determining that the designated event has occurred may include the operations of: comparing the first output current value of the first battery with a predesignated first reference current value; and determining that the designated event has occurred, if the first output current value is equal to or larger than the first reference current value.

In an embodiment, the operation of monitoring whether the designated event has ended may include an operation of monitoring a second output current value of the first battery and at least one of the at least one second battery parallel-connected to the first battery.

In an embodiment, the operation of determining that the designated event has ended may include the operations of: comparing the second output current value with a designated second reference current value; and determining that the designated event has ended, if the second output current value is equal to or smaller than the second reference current value.

The electronic device according to certain embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that certain embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Certain embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to certain embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to certain embodiments, each component (e.g., a module or a program) of the above-described components may include a single entity or multiple entities. According to certain embodiments, one or more of the above-described components may be omitted, or one or more other components may be added. Alternatively or additionally, a plurality of components (e.g., modules or programs) may be integrated into a single component. In such a case, according to certain embodiments, the integrated component may still perform one or more functions of each of the plurality of components in the same or similar manner as they are performed by a corresponding one of the plurality of components before the integration. According to certain embodiments, operations performed by the module, the program, or another component may be carried out sequentially, in parallel, repeatedly, or heuristically, or one or more of the operations may be executed in a different order or omitted, or one or more other operations may be added.

Certain of the above-described embodiments of the present disclosure can be implemented in hardware, firmware or via the execution of software or computer code that can be stored in a recording medium such as a CD ROM, a Digital Versatile Disc (DVD), a magnetic tape, a RAM, a floppy disk, a hard disk, or a magneto-optical disk or computer code downloaded over a network originally stored on a remote recording medium or a non-transitory machine readable medium and to be stored on a local recording medium, so that the methods described herein can be rendered via such software that is stored on the recording medium using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein.

While the present disclosure has been shown and described with reference to various embodiments thereof, it will be understood by those skilled in the art that various changes in form and details may be made therein without departing from the present disclosure as defined by the appended claims and their equivalents.

What is claimed is:

1. An electronic device comprising:
a first battery;
at least one second battery;
a power management module configured to monitor capacity information of the first battery; and
a processor electrically connected to the first battery, the at least one second battery, and the power management module,
wherein the processor is configured to:
monitor whether a designated event_in which necessary power is expected to increase is expected to occur based on monitoring control signals related to the designated event, while the electronic device is driven using the first battery;
determine that the designated event is expected to occur when the at least one second battery is electrically disconnected from the first battery; and
parallel-connect the first battery and at least one of the at least one second battery, based on determining that the designated event is expected to occur,
wherein the designated event is execution of a camera flash operation, a dual speaker amplification operation, a wireless charging power transmission operation, or a magnetic secure transmission operation.

2. The electronic device of claim 1, wherein the processor is further configured to:
monitor whether the designated event has ended, in a state in which the first battery and at least one of the at least one second battery are parallel-connected;
determine that the designated event has ended; and
release the parallel-connection, based on determining that the designated event has ended.

3. The electronic device of claim 1,
wherein the processor is further configured to monitor whether the camera flash operation, the dual speaker amplification operation, the wireless charging power transmission operation, and the magnetic secure transmission operation is expected to occur.

4. The electronic device of claim 1, wherein the power management module is configured to monitor a first output current value of the first battery, and
wherein the processor is further configured to:
compare the first output current value of the first battery with a predesignated first reference current value; and
determine that the designated event has occurred, if the first output current value is equal to or larger than the predesignated first reference current value.

5. The electronic device of claim 4, wherein the power management module is configured to monitor a second output current value, wherein the second output current value is a current output when the first battery and at least one of the at least one second battery are connected in parallel,
wherein the processor is further configured to compare the second output current value with a designated second reference current value and to determine that the designated event has ended, when the second output current value is equal to or smaller than the designated second reference current value, and
wherein the designated second reference current value is smaller than the predesignated first reference current value.

6. The electronic device of claim 4, further comprising a resistor provided between an output end of the first battery and the power management module, wherein
the power management module is further configured to monitor the first output current value by measuring a voltage across both ends of the resistor.

7. The electronic device of claim 4, further comprising a switch provided between an output end of the first battery, the power management module, and an output end of the at least one second battery, wherein the processor is further configured to parallel-connect the first battery and at least one of the at least one second battery by controlling the switch.

8. The electronic device of claim 1, further comprising a housing including a first housing structure and a second housing structure, wherein the first battery is disposed in a space formed in the first housing structure, and the at least one second battery is disposed in a space formed in the second housing structure.

9. The electronic device of claim 8, wherein the housing is a foldable housing.

10. A method for operating an electronic device comprising at least two batteries, the method comprising:
monitoring whether a designated event in which necessary power is expected to increase is expected to occur based on monitoring control signals related to the designated event, while the electronic device is driven using a first battery, wherein the designated event is execution of a camera flash operation, a dual speaker amplification operation, a wireless charging power transmission operation, or a magnetic secure transmission operation;
determining that the designated event is expected to occur; and
parallel-connecting the first battery and at least one of at least one second battery, based on determining that the designated event is expected to occur, wherein the at least one second battery was previously electrically disconnected from the first battery, prior to parallel-connecting.

11. The method of claim 10, further comprising:
monitoring whether the designated event has ended, in a state in which the first battery and at least one of the at least one second battery are parallel-connected;
determining that the designated event has ended; and
releasing the parallel-connection, based on determining that the designated event has ended.

12. The method of claim 10, wherein the monitoring whether the designated event has occurred further comprises:

monitoring a first output current value of the first battery.

13. The method of claim 12, wherein the determining that the designated event is expected to occur further comprises:

comparing the first output current value of the first battery with a predesignated first reference current value; and determining that the designated event has occurred, when the first output current value is equal to or larger than the predesignated first reference current value.

14. An electronic device comprising:

a first battery;

at least one second battery;

a power management module configured to monitor a first output current value of the first battery while the electronic device is driven using the first battery; and a processor electrically connected to the first battery, the at least one second battery, and the power management module, wherein the processor is configured to:

compare the first output current value with a designated first reference current value when the first battery and the at least one second battery are disconnected; and parallel-connect the at least one second battery with the first battery, if the first output current value is equal to or larger than the designated first reference current value;

compare a second output current value, wherein the second output current value is output when the first battery and the at least one second battery are parallel-connected, to a second reference current value, wherein the second reference current value is less than the designated first reference current value; and disconnect the at least one second battery when the second output current value is less than second reference current value.

15. The electronic device of claim 14, further comprising a resistor provided between an output end of the first battery and the power management module, wherein the power management module is further configured to monitor the first output current value by measuring a voltage across both ends of the resistor.

16. The electronic device of claim 14, further comprising a switch provided between an output end of the first battery, the power management module, and an output end of the at least one second battery, wherein the processor is further configured to parallel-connect the first battery and at least one of the at least one second battery by controlling the switch.

* * * * *